United States Patent Office 3,827,913
Patented Aug. 6, 1974

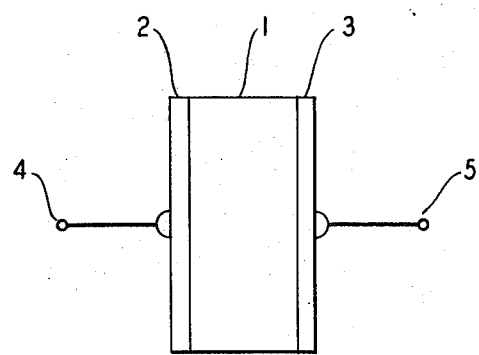

3,827,913
SOLID ELECTROLYTE POWER SOURCE
Alexander Duane Butherus, Murray Hill, and James Charles Phillips, Summit, N.J., and Bruno Scrosati, Rome, Italy, assignors to Bell Telephone Laboratories, Incorporated, Murray Hill, N.J.
Filed May 8, 1972, Ser. No. 250,930
Int. Cl. H01m 11/00
U.S. Cl. 136—83 R                 8 Claims

ABSTRACT OF THE DISCLOSURE

A solid electrolyte battery is disclosed, in which the electrolyte is a member of the class of materials represented by the compositional formula $A_xMg_{(6-x)}E_6$ where A is Ca, Ba or Sr, E is S or Se and $x$ ranges from 0.8 to 1.2. In these electrolytes the transported ion is magnesium. The preferred material of the class is $Ba_xMg_{(6-x)}Se_6$. Cells containing this material together with a metallic magnesium negative electrode and an iodine containing positive electrode exhibit an open circuit voltage of approximately 1.7 volts.

BACKGROUND OF THE INVENTION

(1) Field of the Invention

The invention relates to solid electrolyte electrochemical power sources.

(2) Description of the Prior Art

During the past several years the power source community has put a good deal of effort in the development of solid electrolyte batteries. Such batteries are desirable, for instance, for their mechanical stability and the absence of fluid leakage problems. One of the earliest electronic insulators exhibiting sufficient ionic conductivity to serve as a solid electrolyte was silver iodide [Mrgudich, al., *Proceedings of 19th Annual Power Sources Conference* (May 1965) page 86]. The ionic conductivity of this material at room temperature, while significant, is orders of magnitude lower than the conductivity of common electrolytes. However, silver iodide batteries have been used at higher temperatures where the ionic conductivity is greater. More recently the compound $RbAg_4I_5$ has been found to possess ionic conductivity of the same order of magnitude as common battery electrolytes (G. R. Argue, et al., U.S. Pat. No. 3,519,404 granted July 7, 1970). Batteries using this material together with a silver negative electrode and an iodine-containing positive electrode exhibit an open circuit voltage of approximately 0.6 volts. Such cells have been developed, for instance, for ordnance usage. While useful, these cells possess a relatively low voltage and contain relatively expensive constituents.

SUMMARY OF THE INVENTION

A new class of solid electrolyte batteries has been developed in which the transported ion is the relatively inexpensive element, magnesium. The electrolytes employed can be represented by the compositional formula, $A_xMg_{(6-x)}E_6$; where A can be calcium, strontium, or barium, E can be sulfur or selenium and $x$ ranges from 0.8 to 1.2. The preferred member of this class from the point of view of higher ionic conductivity is $Ba_xMg_{(6-x)}Se_6$. This electrolyte together with a negative electrode containing elemental magnesium and an iodine containing positive electrode produces an open circuit voltage of approximately 1.7 volts. The energy density of primary and secondary batteries in this system is approximately three times the energy density of batteries of equivalent construction in the $RbAg_4I_5$ system.

BRIEF DESCRIPTION OF THE DRAWING

The figure is a sectional view of an exemplary solid electrolyte power source.

DETAILED DESCRIPTION OF THE INVENTION

The Electrolyte

The materials disclosed here as being solid electrolytes can be represented by the compositional formula, $$A_xMg_{(6-x)}E_6$$

where A is barium, calcium or strontium, E is sulfur or selenium and $x$ ranges from 0.8 to 1.2. Materials which contain combinations of the "A" and "E" elements are also contemplated. In these materials the mobile ion is magnesium, believed to be in the doubly ionized state $(Mg^{++})$. The crystalline system in which these materials lie possess a large number of atoms per unit cell (of the order of 50). It is postulated that the high ionic conductivity of these materials result from the fact that only approximately 30 percent of the possible magnesium sites are occupied at any one time and that the migration of a magnesium ion from one site to a neighboring unoccupied site is accomplished with the requirement of only small energies.

Of the several species varients possible within the class, those containing barium and selenium $(Ba_xMg_{(6-x)}Se_6)$ are considered to be preferred. It is postulated that this is due to the fact that for these materials, the ionic radius of the A ion and the E ion are largest relative to the ionic radius of the magnesium ion. For purposes of illustration the examples presented below are among these varients. When combinations of "A" constituents and combinations of "E" constituents are used the amount of each constituent is adjusted so as to preserve the total "A" and "E" molar proportion.

The Negative Electrode

The negative electrode of the power source under consideration contains magnesium in a state of lower oxidation than the mobile ion. The preferred material for use in contact with the electrolyte body is metallic magnesium. If a magnesium compound is used it must possess sufficient mobility for the magnesium ion, to allow migration of magnesium through the negative electrode to the electrolyte surface in order to replenish the magnesium removed from the negative electrode by migration through the electrolyte. The metallic magnesium can be present, for example, in the form of wrought bodies such as sheets or wires, wires being employed, for instance, as a mesh or felt. The magnesium may also be incorporated in such forms as a layer, plated or otherwise deposited on another material, or of as a body of compressed powder. In the construction of a power source, the negative electrode is brought into intimate contact with the solid electrolyte.

The Positive Electrode

The positive electrode of the power source under consideration contains a material capable of combining with the transported ion, with the consumption of electrons. The material may be presented in elemental form, in complexed form or as a compound. The species preferred because of its low reduction potential and the existence of several easily handled complexed forms is iodine. Many compounds which form charge transfer complexes with iodine are known. Some exemplary compounds of this class are poly-N-vinylcarbazole, poly-2-vinylquinoline, perylene and phenothiazine [Gutmann et al., *Electrochemical Science*, 114, (1967) 323]. Another compound containing iodine in easily available form is rubidium iodide $(RbI_3)$. This compound has been used as a positive electrode in conjunction with the silver rubidium iodide solid electrolyte referred to above [De Rossi et al., *Journal of the Electrochemical Society*, 116, (1969) 1642]. The compound $NbSe_2$ also holds $I_2$ in an available form. Other species such as S, Se and Te are also useful although yielding cells with somewhat lower voltage.

The Power Source

The figure shows an exemplary solid electrolyte power source in the form of a single electrochemical cell. The invention contemplates the construction of single cells and series, parallel or combined series-parallel combinations of more than one cell into a battery. In the figure the solid electrolyte 1 is shown to be in intimate contact with the negative electrode 2 and the positive electrode 3. The connection of this power source to the external power consumption device is accomplished through the electrical leads 4 and 5. In the fully charged state the negative electrode 2 contains magnesium as described above and the positive electrode contains a material capable of combining with the transported ion (e.g. iodine). As the source is discharged magnesium is transported from the negative electrode 2 through the electrolyte 1 and chemically combines at or near the interface between the electrolyte 1 and the positive electrode 3. In the fully discharged state either all of the available magnesium in the negative electrode 2 or all of the available combining material in the positive electrode 3 has been consumed leaving a layer of magnesium compound at the interface between electrolyte and the positive electrode. The power source may have been originally constructed in the fully charged state, the fully discharged state or in some intermediate state.

EXAMPLE 1

BaSe and MgSe were placed in an agate mortar in a molar ratio of one part of the first constituent to six parts of the second constituent. They were ground together in a dry argon atmosphere ($\leq 10$ p.p.m. $H_2O$ and $\sim 10$ p.p.m. $O_2$) resulting in a throughly mixed powder of approximately 400 mesh. The mixture was pressed into a 1.26 centimeter diameter pellet approximately 0.5 centimeter thick in a press which applied a pressure of 1,000 kilograms per square centimeter. The pellet was placed in a carbon boat contained in a quartz reaction tube and outgassed at 200° C. under vacuum for approximately four hours. The tube was then sealed while under vacuum and placed in a furnace. The furnace temperature was slowly brought up to about 1000° C. over a period of approximately two days and held at that temperature for approximately 12 days. It was then slowly brought back to room temperature. The ionic specific resistance of the resulting pellet was 200 ohm centimeters. These measurements were made on a resistance bridge using two magnesium electrodes. Investigation of the pellet by X-ray diffraction showed the presence of crystalline matter not present in the starting materials.

EXAMPLE 2

A 1.2 centimeter diameter pellet approximately 2 millimeters thick of pressed magesium powder was formed by compressing 400 mesh powder at a pressure of 500 kilograms per square centimeter. This was placed on one side of an electrolyte pellet formed as in Example 1. On the positive side of the electrolyte a pressed pellet of equal molar parts of $NbSe_2$ and $I_2$ was placed and the resulting electrochemical cell was placed in a cell holder. The cell exhibited an open circuit voltage of 1.74 volts. The cell was discharged for 14 hours at 26 microamperes and exhibited an open circuit voltage at the end of this time of 1.26 volts.

EXAMPLE 3

A cell constructed as in Example 2, but with a 2 millimeter thick electrolyte pellet was cycled at 25 microamperes in a 30 second charge-30 second discharge cycle for 350 cycles with no observable degradation. This cell was then left open circuited for three days with no observable change in the open circuit voltage at the end of that time period indicating that the electronic leakage through the electrolyte was small.

What is claimed is:

1. A battery comprising a positive electrode containing a first atomic species and a negative electrode containing a second atomic species separated by, and in contact with, a body of a solid electrolyte characterized in that the second atomic species consists of magnesium and in that the solid electrolyte is, of a composition represented by the formula, $A_xMg_{(6-x)}Se_6$ where A is at least one member selected from the group consisting of Ca, Ba and Sr and $x$ ranges from 0.8 to 1.2, which solid electrolyte is produced by
    (a) intimately mixing initial powders consisting essentially of $x$ molar parts of ASe and (6—x) molar parts of MgSe;
    (b) compressing the mixed powder;
    (c) sealing the compressed powder into a container;
    (d) heating the compressed powder to a temperature for a period sufficient to produce crystalline matter different from that contained in the initial powders, so as to produce a solid electrolyte which possesses an ionic specific resistance no greater than 200 ohm-centimeters.

2. A device of claim 1 in which the first atomic species is iodine.

3. A device of claim 1 in the state of at least partial discharge in which the positive electrode contains a chemical compound of magnesium together with the first atomic species.

4. A device of claim 3 in which the chemical compound is $MgI_2$.

5. A device of claim 1 in which the electrolyte is $Ba_xMg_{(6-x)}Se_6$.

6. A device of claim 5 in which the negative electrode consists essentially of metallic magnesium and the positive electrode contains the atomic species, iodine.

7. A device of claim 1 comprising at least two electrically connected units, each unit consisting essentially of a positive electrode, an electrolyte body and a negative electrode.

8. A battery of claim 1 containing only one cell.

References Cited

UNITED STATES PATENTS 3,701,686  10/1972  Argue et al. _____ 136—83

WINSTON A. DOUGLAS, Primary Examiner

C. F. LEFEVOUR, Assistant Examiner

U.S. Cl. X.R.

136—6 L, 153